United States Patent
Brainard et al.

(10) Patent No.: US 10,915,542 B1
(45) Date of Patent: Feb. 9, 2021

(54) CONTEXTUAL MODIFICATION OF DATA SHARING CONSTRAINTS IN A DISTRIBUTED DATABASE SYSTEM THAT USES A MULTI-MASTER REPLICATION SCHEME

(71) Applicant: Palantir Technologies Inc., Palo Alto, CA (US)

(72) Inventors: Katherine Brainard, East Orange, NJ (US); Ernest Zeidman, Palo Alto, CA (US); Ilya Nepomnyashchiy, Mountain View, CA (US)

(73) Assignee: Palantir Technologies Inc., Palo Alto, CA (US)

( * ) Notice: Subject to any disclaimer, the term of this patent is extended or adjusted under 35 U.S.C. 154(b) by 376 days.

(21) Appl. No.: 15/906,625

(22) Filed: Feb. 27, 2018

Related U.S. Application Data (60) Provisional application No. 62/607,566, filed on Dec. 19, 2017.

(51) Int. Cl.
| | |
|---|---|
| *G06F 16/248* | (2019.01) |
| *G06F 7/14* | (2006.01) |
| *G06F 16/9535* | (2019.01) |
| *G06F 16/28* | (2019.01) |

(52) U.S. Cl.
CPC .............. *G06F 16/248* (2019.01); *G06F 7/14* (2013.01); *G06F 16/288* (2019.01); *G06F 16/9535* (2019.01)

(58) Field of Classification Search
CPC .. G06F 16/2379; G06F 16/9535; G06F 16/27; G06F 16/245; G06F 16/9024; G06F 16/065; G06F 16/275

USPC ................................. 707/770, 703, 736, 756
See application file for complete search history.

(56) References Cited

U.S. PATENT DOCUMENTS

| | | |
|---|---|---|
| 5,548,749 A | 8/1996 | Kroenke et al. |
| 5,708,828 A | 1/1998 | Coleman |
| 5,765,171 A | 6/1998 | Gehani et al. |
| 5,870,761 A | 2/1999 | Demers et al. |
| 6,098,078 A | 8/2000 | Gehani et al. |
| 6,190,053 B1 | 2/2001 | Stahlecker et al. |
| 6,202,085 B1 | 3/2001 | Benson et al. |
| 6,216,140 B1 | 4/2001 | Kramer |

(Continued)

FOREIGN PATENT DOCUMENTS

| | | |
|---|---|---|
| AU | 2011279270 | 9/2015 |
| EP | 0 816 968 | 1/1996 |

(Continued)

OTHER PUBLICATIONS

Dell Latitude D600 2003, Dell Inc., http://www.dell.com/downloads/global/products/latit/en/spec_latit_d600_en.pdf.

(Continued)

*Primary Examiner* — Robert W Beausoliel, Jr.
*Assistant Examiner* — Pedro J Santos
(74) *Attorney, Agent, or Firm* — Hickman Palermo Becker Bingham LLP; Christine E. Orich (57) ABSTRACT

Techniques for contextual modification of data sharing constraints in a distributed database system are disclosed. The constraint modifications can improve data sharing processes, particularly in applications that involve cross-model data sharing and/or have a need for low data latency.

20 Claims, 7 Drawing Sheets

(56) References Cited

U.S. PATENT DOCUMENTS

| | | |
|---|---|---|
| 6,240,414 B1 | 5/2001 | Beizer et al. |
| 6,317,754 B1 | 11/2001 | Peng |
| 6,374,252 B1 | 4/2002 | Althoff et al. |
| 6,539,381 B1 | 3/2003 | Prasad et al. |
| 6,560,620 B1 | 5/2003 | Ching |
| 6,816,941 B1 | 11/2004 | Carlson et al. |
| 7,072,911 B1 | 7/2006 | Doman |
| 7,167,877 B2 | 1/2007 | Balogh et al. |
| 7,437,664 B2 | 10/2008 | Borson |
| 7,596,285 B2 | 9/2009 | Brown et al. |
| 7,676,788 B1 | 3/2010 | Ousterhout et al. |
| 7,730,396 B2 | 6/2010 | Chidlovskii et al. |
| 7,818,297 B2 | 10/2010 | Peleg et al. |
| 7,877,421 B2 | 1/2011 | Berger et al. |
| 7,962,495 B2 | 6/2011 | Jain et al. |
| 8,015,151 B2 | 9/2011 | Lier et al. |
| 8,290,990 B2 | 10/2012 | Drath et al. |
| 8,301,904 B1 | 10/2012 | Gryaznov |
| 8,312,546 B2 | 11/2012 | Alme |
| 8,316,060 B1 | 11/2012 | Snyder et al. |
| 8,380,659 B2 | 2/2013 | Zunger |
| 8,442,940 B1 | 5/2013 | Faletti et al. |
| 8,515,912 B2 | 8/2013 | Garrod et al. |
| 8,527,461 B2 | 9/2013 | Ducott, III et al. |
| 8,646,080 B2 | 2/2014 | Williamson et al. |
| 8,688,749 B1 | 4/2014 | Ducott, III et al. |
| 8,726,379 B1 | 5/2014 | Stiansen et al. |
| 8,782,004 B2 | 7/2014 | Ducott, III et al. |
| 8,838,538 B1 | 9/2014 | Landau et al. |
| 8,886,601 B1 | 11/2014 | Landau et al. |
| 9,009,827 B1 | 4/2015 | Albertson et al. |
| 9,081,975 B2 | 7/2015 | Ducott, III et al. |
| 9,275,069 B1 | 3/2016 | Garrod et al. |
| 9,330,157 B2 | 5/2016 | Ducott, III et al. |
| 9,501,761 B2 | 11/2016 | Richards et al. |
| 9,857,960 B1 | 1/2018 | Dennis et al. |
| 2003/0084017 A1 | 5/2003 | Ordille |
| 2003/0088654 A1 | 5/2003 | Good et al. |
| 2003/0182313 A1 | 9/2003 | Federwisch et al. |
| 2004/0103124 A1 | 5/2004 | Kupkova |
| 2004/0111390 A1 | 6/2004 | Saito et al. |
| 2004/0250576 A1 | 12/2004 | Flanders |
| 2005/0034107 A1 | 2/2005 | Kendall et al. |
| 2005/0108063 A1 | 5/2005 | Madill et al. |
| 2005/0193024 A1 | 9/2005 | Beyer et al. |
| 2006/0036568 A1 | 2/2006 | Moore et al. |
| 2006/0106879 A1 | 5/2006 | Zondervan et al. |
| 2006/0155945 A1 | 7/2006 | McGarvey |
| 2006/0190497 A1 | 8/2006 | Inturi et al. |
| 2006/0206866 A1 | 9/2006 | Eldrige et al. |
| 2006/0218637 A1 | 9/2006 | Thomas et al. |
| 2006/0224579 A1 | 10/2006 | Zheng |
| 2007/0005707 A1 | 1/2007 | Teodosiu et al. |
| 2007/0026373 A1 | 2/2007 | Suriyanarayanan et al. |
| 2007/0112887 A1 | 5/2007 | Liu et al. |
| 2007/0168516 A1 | 7/2007 | Liu et al. |
| 2007/0180075 A1 | 8/2007 | Chasman et al. |
| 2007/0220067 A1 | 9/2007 | Suriyanarayanan et al. |
| 2007/0220328 A1 | 9/2007 | Liu et al. |
| 2007/0233756 A1 | 10/2007 | D'Souza et al. |
| 2007/0288533 A1 | 12/2007 | Srivastava et al. |
| 2007/0299887 A1 | 12/2007 | Novik et al. |
| 2008/0027981 A1 | 1/2008 | Wahl |
| 2008/0033753 A1 | 2/2008 | Canda et al. |
| 2008/0086718 A1 | 4/2008 | Bostick et al. |
| 2008/0141117 A1 | 6/2008 | King et al. |
| 2008/0148398 A1 | 6/2008 | Mezack et al. |
| 2008/0189240 A1 | 8/2008 | Mullins et al. |
| 2008/0235575 A1 | 9/2008 | Weiss |
| 2008/0243951 A1 | 10/2008 | Webman et al. |
| 2008/0320299 A1 | 12/2008 | Wobber et al. |
| 2009/0172821 A1 | 7/2009 | Daira et al. |
| 2009/0199090 A1 | 8/2009 | Poston et al. |
| 2009/0254970 A1 | 10/2009 | Agarwal et al. |
| 2009/0313311 A1* | 12/2009 | Hoffmann ........... G06F 11/2097 |
| 2010/0079488 A1* | 4/2010 | McGreevy ............ G09G 5/00 345/629 |
| 2010/0100963 A1 | 4/2010 | Mahaffey |
| 2010/0145909 A1 | 6/2010 | Ngo |
| 2010/0268691 A1* | 10/2010 | Grinstein ........... G06F 9/44521 707/682 |
| 2010/0330801 A1 | 12/2010 | Rouh |
| 2011/0010342 A1 | 1/2011 | Chen et al. |
| 2011/0173155 A1 | 7/2011 | Becchi et al. |
| 2011/0219450 A1 | 9/2011 | McDougal et al. |
| 2011/0246229 A1 | 10/2011 | Pacha |
| 2012/0005159 A1 | 1/2012 | Wang et al. |
| 2012/0016849 A1 | 1/2012 | Garrod et al. |
| 2012/0023075 A1 | 1/2012 | Pulfer et al. |
| 2012/0036106 A1 | 2/2012 | Desai et al. |
| 2012/0254129 A1 | 10/2012 | Wheeler et al. |
| 2013/0006655 A1 | 1/2013 | Van Arkel et al. |
| 2013/0006668 A1 | 1/2013 | Van Arkel et al. |
| 2013/0067017 A1 | 3/2013 | Carriere et al. |
| 2013/0097595 A1 | 4/2013 | Stern et al. |
| 2013/0173540 A1 | 7/2013 | Qian et al. |
| 2013/0191336 A1 | 7/2013 | Ducott et al. |
| 2013/0191338 A1 | 7/2013 | Ducott, III et al. |
| 2013/0276799 A1 | 10/2013 | Davidson |
| 2013/0346444 A1 | 12/2013 | Makkar et al. |
| 2014/0011000 A1 | 1/2014 | Dunkmann et al. |
| 2014/0040182 A1 | 2/2014 | Gilder et al. |
| 2014/0040714 A1 | 2/2014 | Siegel et al. |
| 2014/0074887 A1* | 3/2014 | Neels .................... G06F 16/248 707/779 |
| 2014/0081652 A1 | 3/2014 | Klindworth |
| 2014/0114972 A1 | 4/2014 | Ducott et al. |
| 2014/0129518 A1 | 5/2014 | Ducott et al. |
| 2014/0149130 A1 | 5/2014 | Getchius |
| 2014/0358812 A1 | 12/2014 | Hourte et al. |
| 2015/0074050 A1 | 3/2015 | Landau et al. |
| 2015/0235334 A1 | 8/2015 | Wang et al. |
| 2015/0261847 A1 | 9/2015 | Ducott et al. |
| 2016/0019252 A1 | 1/2016 | Ducott et al. |
| 2016/0092491 A1 | 3/2016 | Cowling et al. |
| 2018/0181637 A1 | 6/2018 | Freiberg et al. |

FOREIGN PATENT DOCUMENTS

| | | |
|---|---|---|
| EP | 1647908 | 4/2006 |
| EP | 2911078 | 8/2015 |
| NL | 2011642 | 8/2015 |
| WO | WO 2008/113059 | 9/2008 |
| WO | WO 2011/161565 | 12/2011 |
| WO | WO 2012/009397 | 1/2012 |

OTHER PUBLICATIONS

Fidge, Colin J., "Timestamps in Message-Passing Systems," K. Raymond (Ed.) Proc. of the 11th Australian Computer Science Conference (ACSC 1988), pp. 56-66.

O'Sullivan, Bryan, "Making Sense of Revision Control Systems," Communications of the ACM, Sep. 2009, vol. 52, No. 9, pp. 57-62.

OWL Web Ontology Language Reference Feb 04, W3C, http://www.w3.org/TR/owl-ref/, dated Aug. 5, 2015. 4 pages.

Holliday, JoAnne, "Replicated Database Recovery using Multicast Communication," IEEE 2002, pp. 11.

Symantec Corporation, "E-Security Begins with Sound Security Policies," Announcement Symantec, Jun. 14, 2001.

Parker, Jr. et al., "Detection of Mutual Inconsistency in Distributed Systems," IEEE Transactions in Software Engineering, May 1983, vol. SE-9, No. 3, pp. 241-247.

Mattern, F., "Virtual Time and Global States of Distributed Systems," Cosnard, M., Proc. Workshop on Parallel and Distributed Algorithms, Chateau de Bonas, France:Elsevier.

Dou et al., "Ontology Translation on the Semantic Web 2005," Springer-Verlag, Journal on Data Semantics II Lecture Notes in Computer Science, vol. 3350, pp. 35-37.

Loeliger, Jon, "Version Control with Git," O'Reilly, May 2009, pp. 330.

(56) References Cited

OTHER PUBLICATIONS

Lam Port, "Time, Clocks and the Ordering of Events in a Distributed System," Communications of the ACM, Jul. 1978, vol. 21, No. 7, pp. 558-565.

\* cited by examiner

CONTEXTUAL MODIFICATION OF DATA SHARING CONSTRAINTS IN A DISTRIBUTED DATABASE SYSTEM THAT USES A MULTI-MASTER REPLICATION SCHEME

CROSS-REFERENCE TO RELATED APPLICATIONS; BENEFIT CLAIM

This application claims the benefit of U.S. Provisional Patent Application No. 62/607,566, filed Dec. 19, 2017, the entire contents of which is hereby incorporated by reference as if fully set forth herein, under 35 U.S.C. § 119(e). The applicant(s) hereby rescind any disclaimer of claim scope in the parent application(s) or the prosecution history thereof and advise the USPTO that the claims in this application may be broader than any claim in the parent application(s).

COPYRIGHT STATEMENT

A portion of the disclosure of this patent document may contain material which is subject to copyright protection. The copyright owner has no objection to the facsimile reproduction by anyone of the patent document or the patent disclosure as it appears in the Patent and Trademark Office patent file or records, but otherwise reserves all copyright rights whatsoever.

TECHNICAL FIELD

The present disclosure relates to distributed database systems that use a multi-master replication scheme, and more particularly to computer-implemented techniques for contextual modification of data sharing constraints in the distributed system.

BACKGROUND

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

In a distributed database system, multiple interrelated databases can be implemented in multiple different physical computers and/or data storage devices that are connected by a network. A database management system includes software that provides an interface by which other software applications can access data stored in the distributed databases. A multi-master database replication system includes software that can be used to propagate data changes made by individual databases to other databases in the distributed system.

Individual databases in the distributed system can be heterogeneous in that some of the databases may organize stored data according to different logical structures or models. The manner in which stored data can be accessed and manipulated by software is determined by the model that is used by a particular database.

Information retrieval technologies can be used to search and obtain data stored in the databases in a distributed system. Federated searching is an approach for searching multiple different databases using a single query request.

DETAILED DESCRIPTION

Conflict resolution and access control issues can significantly increase latency in multi-master replication systems. Heterogeneous databases can further complicate replication due to the need for cross-model object resolution. These and other concerns pose challenges for software-based services, particularly those that have a need for lower latency data sharing, such as federated searching and other information retrieval technologies.

This disclosure describes technologies for enabling lower-latency data sharing across heterogeneous databases in a distributed database system that uses a multi-master replication scheme. The disclosed approaches can be employed in response to, for example, a search query initiated by push or pull information retrieval technologies or data export/import operations. The disclosed technologies are described in detail below, with reference to the drawings. The full scope of the disclosed technologies includes, but is not limited to, the specific examples that are described below and shown in the drawings.

General Overview

In an embodiment, a computer system comprises one or more processors; one or more storage media storing instructions which, when executed by the one or more processors, cause the one or more processors to perform operations comprising: receiving data sharing request data relating to a data model that is displayable in a data visualization interface, the data model comprising a graphical representation of at least a portion of a database; modifying a data sharing parameter associated with the data model based on the data sharing request data; using the modified data sharing parameter, generating a shareable version of the data model; merging the shareable version of the data model with a different data model, the different data model comprising a graphical representation of at least a portion of a different database.

Examples of data sharing request data include data associated with a data import, data export, search query, data filter operation, or data feed operation. Examples of data models include graph portions that are to be imported or exported or retrieved by a search query. Examples of data sharing parameters include data values that indicate whether the system is to execute or skip particular acknowledgement processes, conflict resolution processes, object resolution processes, deconflicting processes, access control processes.

An example of modifying a data sharing parameter includes relaxing a programmable constraint based on the type of data sharing request. An example of a sharable version of a data model is a portion of a model stored in an export file. An example of merging includes importing a model into a workspace that is associated with a different model.

In another embodiment, a computer system comprises one or more processors; one or more storage media storing instructions which, when executed by the one or more processors, cause the one or more processors to perform operations comprising: displaying at least a portion of a data model in a data visualization interface, the data model comprising a graphical representation of a database; by an input element of the data visualization interface, receiving data sharing request data; determining a modified data sharing parameter associated with the data model, the modified data sharing parameter modified based on the data sharing request data; using the modified data sharing parameter, merging a shareable portion of a different data model with the data model in the data visualization interface, the different data model comprising a graphical representation of at least a portion of a different database.

In yet another embodiment, a data processing method comprises displaying at least a portion of a data model in a data visualization interface, the data model comprising a graphical representation of at least a portion of a database; by an input element of the data visualization interface, receiving data sharing request data; determining a modified a data sharing parameter associated with the data model, the modified data sharing parameter modified based on the data sharing request data; using the modified data sharing parameter, merging a shareable portion of a different data model with the data model in the data visualization interface, the different data model comprising a graphical representation of at least a portion of a different database, wherein the method is performed using one or more processors.

System Overview

Figure 1A:
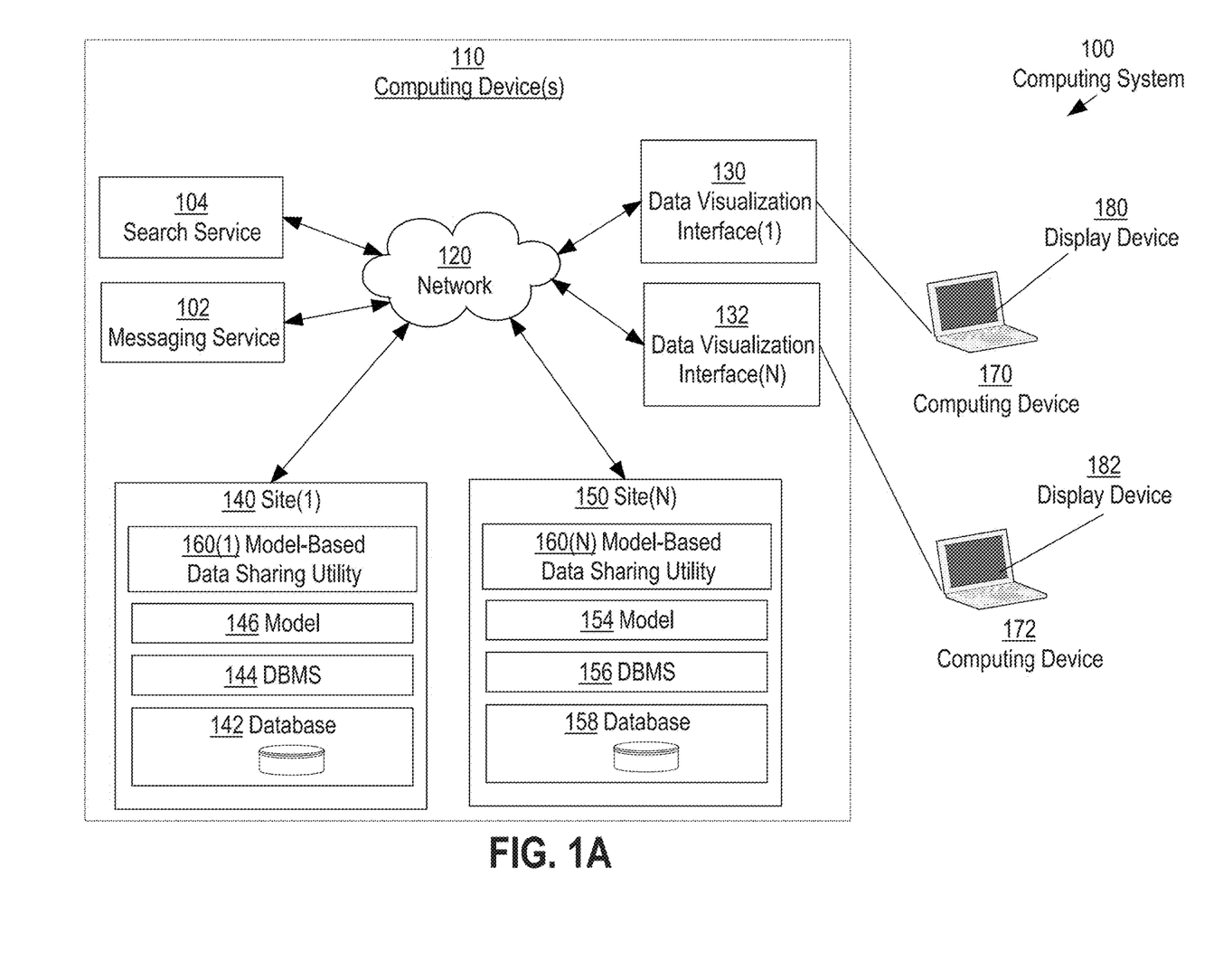
FIG. 1A is a block diagram that depicts an example system for sharing data between databases on a network.

FIG. 1A is a block diagram that depicts an example computing system. In the example of FIG. 1A, a computing system 100 is arranged to enable data sharing across data storage sites 140, 150 in coordination with data visualization interfaces 130, 132. Computing system 100 includes computing device(s) 110, computing devices 170, 172, and display devices 180, 182, which are communicatively coupled to an electronic communications network 120. The notations "(1)" and "(N)" are used to indicate that a version of computing system 100 can include any number "N" (where N is a positive integer) of data visualization interfaces 130, 132 and any number of sites 140, 150.

Implemented in the computing devices 110, 170, 172, 180, 182 using computer software, hardware, or software and hardware, are processor-executable instructions, data structures, and digital data, stored in memory, which cooperate to provide the computer-implemented functionality described herein. For ease of discussion, these computer-implemented components are represented schematically in FIG. 1 as messaging service 102, search service 104, data visualization interface 130, data visualization interface 132, site 140, site 150. When executed by a processor, the instructions cause computing devices 110, 170, 172, 180, 182 to operate in a particular manner as described herein.

System as used herein may refer to a single computer or network of computers and/or other devices. Computing device as used herein may refer to a computer or any other electronic device that is equipped with a processor. Although computing system 100 may be implemented with any number of messaging service 102, search service 104, data visualization interface 130, data visualization interface 132, sites 140, 150, computing device(s) 110, display devices 180, 182 and computing devices 170, 172, respectively, in this disclosure, these elements may be referred to in the singular form for ease of discussion.

Messaging service 102, search service 104, data visualization interfaces 130, 132, sites 140, 150 are shown as separate elements in FIG. 1 for ease of discussion but the illustration is not meant to imply that separation of these elements is required. The illustrated systems (or their functionality) may be divided over any number of physical systems, including a single physical computer system, and can communicate with each other in any appropriate manner.

In some embodiments, each of computing devices 170, 172 is a client-side computing device or set of cooperating computing devices, such as a smart phone, tablet computer, desktop computer, laptop machine, or combination of any of such devices, and computing device(s) 110 are server-side computing device(s) such as a server computer or network of server computers accessible by network 120. As illustrated in FIG. 1, each of display devices 180, 182 is implemented in a computing device 170, 172, respectively, but may be implemented as a separate device or as part of another device, or as multiple networked display devices, in other implementations.

The example messaging service 102 coordinates with data visualization interfaces 130, 132, for example through application programming interfaces (APIs) exposed by messaging service 102, to enable data stored in one of the sites 140, 150 to be shared with another of the sites 140, 150 over network 120 by way of an electronic messaging paradigm made available through data visualization interfaces 130, 132. For example, a file containing a subset of data stored at site 140 may be generated by a computing device 170 operating data visualization interface 130 and transmitted over network 120 via messaging service 102 to a computing device 172 operating data visualization interface 132. Portions of messaging service 102 may be implemented as a public or private electronic mail system, or as a text messaging service such as SMS (Short Message Service), or as a messaging service that is tightly coupled with the data visualization interfaces 130, 132 in that messages may only be sent to other data visualization interfaces 130, 332 within the network 120.

The example search service 104 can be called upon by data visualization interfaces 130, 132 to facilitate data sharing across sites 140, 150 by executing search queries using search terms obtained by input elements of data visualization interfaces 130, 132, such as interactive text boxes, buttons, check boxes, radio buttons. Search service 104 can be implemented as a federated searching tool. Search service 104 may provide full-text querying across multiple data sites 140, 150, and may include structured and unstructured data search and retrieval capabilities. Alternatively, or in addition, search service 104 can include a filtering tool for creating focused subsets of large data sets by executing computer-implemented clustering algorithms.

Network 120 may be implemented on any medium or mechanism that provides for the exchange of data between the devices that are connected to the network. Examples of network 120 include, without limitation, a network such as a Local Area Network (LAN), Wide Area Network (WAN), Ethernet or the Internet, or one or more terrestrial, satellite or wireless links. Network 120 may include a combination of networks, such as a combination of wired, optical and/or wireless networks, as needed to enable communications between the devices that are connected to the network.

Sites 140, 150 can each be implemented as peer replication sites in a multi-master replication scheme of a distributed database system. That is, sites 140, 150 may be configured to propagate database changes directly to each other rather than by way of a centralized database. An example of a multi-master replication scheme that may be used by sites 140, 150 is described in U.S. Pat. No. 8,515,912, titled "Sharing and Deconflicting Data Changes in a Multimaster Database System."

Site 140 includes a database 142 and site 150 includes a database 158. Databases 142, 158 may include copies of the same body of data or may comprise different bodies of data. Databases 142, 158 may store data using, for example, table- or object-based data structures. For example, databases 142, 158 may be implemented using a relational or object-based database technology. Databases 142, 158 may be heterogenous.

A database management system (DBMS) 144, 156 is a software system that includes application programming interfaces (APIs) and other tools that can be used by or cooperate with other software applications, such as data visualization interfaces 130, 132, to create, store, view, manipulate data in the databases 142, 158. An example of a DBMS that may be used by sites 140, 150 is a commercially available DBMS, such as a DBMS provided by Oracle Corporation of Redwood Shores, Calif. or Microsoft Corporation of Redmond, Wash.

Each site 140, 150 also stores a model 146, 154 of its respective database 142, 158. Models 146, 154 are conceptual abstractions of the underlying physical structure and organization of databases 142, 158 and the data stored in databases 142, 158. Models 146, 154 may be implemented as graphical representations of databases 142, 158. Graph 402 shown in FIG. 4, described below, is an example of a graphical representation of a portion of a database. Models 146, 154 may be viewed, created, or manipulated by, for example, a graph utility of data visualization interfaces 130, 132 interacting with databases 142, 158 through DBMSs 144, 156 via network 120.

An ontology is an example of a form of object-based data model that may be used to implement models 146, 154, and which is capable of graphical representation. In general, an ontology specifies the data objects, properties of the data objects, and relationships (links) between the data objects that are used to organize and store data in the databases 142, 158. Ontologies can be created using commercially available software. An example of ontology software that may be used to create models 146, 154 is described in U.S. Pat. No. 7,962,495, titled "Creating Data in a Data Store Using a Dynamic Ontology."

If databases 142, 158 are heterogenous, one or more aspects of their corresponding models 146, 154 are different. For instance, models 146, 154 may use different labels to identify particular data objects, links, or properties. As another example, one of models 146, 154 may define a data object for a type of data whereas the other model may define the same category of data as a property of a data object rather than as a data object. As yet another example, different models 146, 154 may specify different types of links between data objects. For instance, models 146, 154 may utilize different labels to describe analogous relationships between data objects.

Data visualization interfaces 130, 132 are instances of a software application that allows users of computing devices 170, 172 to interact with databases 142, 158, respectively, through communications with database management systems 144, 156. The illustrative data visualization interfaces 130, 132 include graphing software that can generate and display graphs that represent portions of the models 146, 154. The graphing software allows updating of the models 146, 154 and/or the underlying data by manipulation of the graph in a graphical interface.

Data visualization interfaces 130, 132 include ad-hoc data search and retrieval functionality through coordination with search service 104, which enables the data visualization interfaces 130, 132 to perform federated searching of multiple databases 142, 158 to, for example, obtain data changes and/or data updates that have been made at other sites 140, 150.

Data visualization interfaces 130, 132 include ad-hoc data sharing functionality through coordination with messaging service 102, which enables the data visualization interfaces 130, 132 to share portions of models 146, 154 and/or the underlying data stored in databases 142, 158 created, changed or updated at one site 140, 150 with one or more other sites 140, 150, using electronic messaging. The data search, retrieval and sharing functionality provided by data visualization interfaces 130, 132 can be provided alternatively or in addition to formal multi-master data replication processes.

To implement the ad-hoc data sharing features of data visualization interfaces 130, 132, each of sites 140, 150 includes a model-based data sharing utility 160. Model-based data sharing utility 160 comprises software or a combination of computer hardware and software that allows the data visualization interfaces 130, 132 to share portions of models 146, 154, including data stored in the underlying databases 142, 158, with one another as peers even if sites 140, 150 are not set up as peer replication sites. Model-based data sharing utility 160 can implement context-based constraint modifications during a data sharing process, as described in more detail below.

Figure 1B:
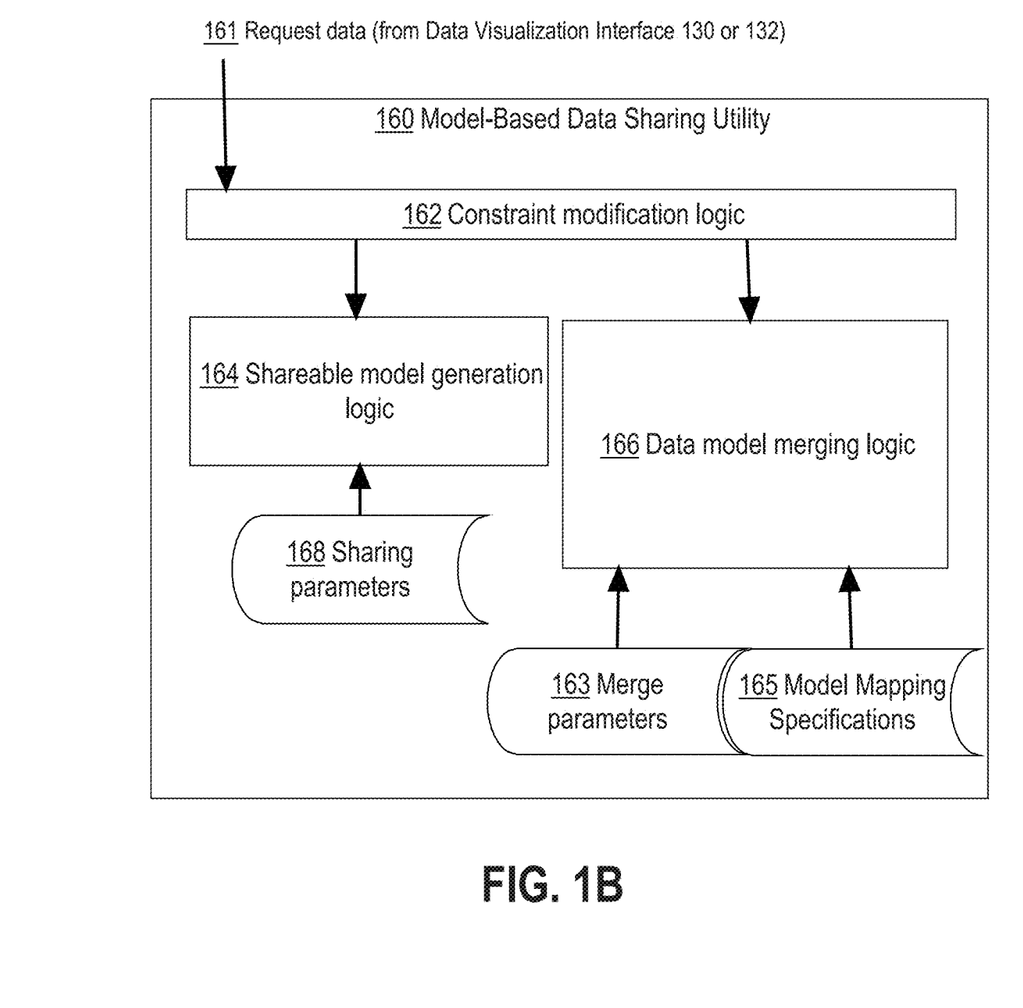
FIG. 1B is a block diagram that depicts an example of the model-based data sharing utility of FIG. 1A.

FIG. 1B is a block diagram that depicts an example of the model-based data sharing utility of FIG. 1A. The example model-based data sharing utility 160 includes constraint modification logic 162, shareable model generation logic 164, data model merging logic 166.

In operation, an instance of data visualization interface 130, 132 is associated with a particular one of the sites 140, 150, including its database 142, 158 and its corresponding model 146, 154. Constraint modification logic 162 is invoked by data visualization interface 130, 132 when a data sharing operation is initiated within data visualization interface 130, 132.

A data sharing operation may involve sharing a portion of a model 146, 154 and/or database 142, 158 that is associated with the particular instance of the data visualization interface 130, 132 that initiated the data sharing operation with another instance of data visualization interface 130, 132 (for example, a data export process). Another type of data sharing operation may involve retrieving a portion of a model 146, 154 and/or database 142, 158 from another site 140, 150 and incorporating it into the data visualization interface 130, 132 that initiated the data sharing operation (for example, an import, search, or feed operation). Another type of data sharing operation may involve filtering a portion of a model 146, 154 from a current display of a model in a data visualization interface 130, 132.

Constraint modification logic 162 when executed by a processor obtains data sharing request data 161 from a data visualization interface 130, 132. Data sharing request data 161 may include, for example, a request type identifier that indicates the type of data sharing process requested in the data visualization interface 130, 132. Example types of data sharing requests include import, export, search, filter, and feed operations. Data sharing request data 161 may further include variable data to be used as a parameter in executing a data sharing process. For example, if the request type is search, filter, or feed, data sharing request data 161 may include keywords to be used in conducting the search, filter, or feed operation. If the request type is import or export, data sharing request data 161 may include a database identifier and/or export file identifier.

Constraint modification logic 162 applies rules or policies that are implemented in computer code and/or data structures (mapping tables, for example) to the data sharing request data 161 to determine whether any data sharing constraints associated with the requested data sharing operation can be modified based on the particular data sharing request data 161. As an example, constraint modification logic 162 may cause computing system 100 to relax one or more data sharing constraints, for example by using data extracted from acknowledgement messages ("ACKs") associated with previously-executed data transmissions in order to determine whether to skip a data transmission and/or conflict resolution process that is associated with a current search request (a particular instance of data sharing request data 161).

In some embodiments, constraint modification logic 162 can use ACKs to skip portions of data sharing processes. In one example, if a federated data store (such as database 142 or 158) that is being contacted by a search request has previously received an ACK for a piece of data that matches a current search request, and the ACK matches the version of the data that the federated data store sees as most current, then the federated data store can skip sending that data back to the requesting system. In another example, if the requesting system receives a piece of data at a version that is older than the version that the federated data store sees as current (which may include the results of conflict resolution), the requesting system can skip conflict resolution and/or skip storage of the out-of-date data. In other words, computing system 100 can selectively extract metadata about previously executed data sharing processes from ACK messages associated with those processes and compare that metadata to metadata in the federated data store, in order to determine whether to proceed with or skip a data sharing process or a conflict resolution process that normally would be performed in response to the search request.

Selective modification of data sharing constraints can improve latency. As used herein, data sharing constraints may refer to conditions that need to be met before a data sharing event can be completed. These conditions can be implemented for instance using rules (logic that causes the computing system to perform another action) and/or constraints (logic that causes the system to 'flag' a data item as potentially in violation of a constraint). In one example, when data is shared in a distributed database system, the system needs to make sure that the most recent version of the data is the one that is saved. In an embodiment, the system may determine which of two concurrent database changes to save and propagate, using a deconflicting process. Furthermore, when access control levels are associated with certain data, the system needs to make sure that those access control levels propagate with the shared data and are maintained by sites receiving the data. And, when a data sharing process involves heterogenous databases or different models, the system needs to make sure that the correct semantics are assigned to the shared data in the receiving database and the corresponding model is updated accordingly. Still further, the system needs to make sure that appropriate data validation rules are enforced on shared data.

Examples of these and other types of data sharing constraints are discussed in U.S. Pat. No. 8,515,912, titled "Sharing and Deconflicting Data Changes in a Multimaster Database System," and U.S. Pat. No. 8,688,749, titled "Cross-Ontology Multi-Master Replication," and U.S. Pat. No. 9,081,975, titled "Sharing Information Between Nexuses that Use Different Classification Schemes for Information Access Control," and U.S. Pat. No. 9,501,761, titled "System and Method for Sharing Investigation Results," and U.S. Pat. No. 14,887,071, filed Oct. 19, 2015, titled "Data Collaboration Between Different Entities."

Shareable model generation logic 164 is invoked by the data visualization interface 130, 132 that is associated with the site 140, 150 that is to share data as determined based on the particular data sharing request data 161. Shareable model generation logic 164 uses the constraint modifications that are determined by constraint modification logic 162 to generate a shareable version of at least a portion of the data model that is to be shared pursuant to the particular data sharing request 161. Examples of processes that can be used by shareable model generation logic 164 to generate a shareable model are described in the aforementioned patents.

Shareable model generation logic 164 modifies a set of stored data sharing parameters 168 based on the constraint modifications that are determined by constraint modification logic 162, to create a context-specific version of sharing parameters 168. Shareable model generation logic 164 uses the context-specific version of sharing parameters 168 to generate the shareable model.

Examples of sharing parameters 168 include data values, such as a flag that is set to yes or no, or a value that is changed from 0 to 1, that serve as indicators that enable shareable model generation logic 164 to determine whether to execute or skip certain data sharing processes while generating the shareable model. For example, if data sharing request data 161 indicates that the requested sharing operation involves a data export, shareable model generation logic 164 may determine to skip or execute one or more conflict resolution processes in order to reduce the amount of time it takes to generate the shareable model. Skipped conflict resolution processes may be deferred until the shareable model is imported or otherwise incorporated into the model that is to receive the shared data, in which case the shareable model may include an indicator that such processes have been skipped and need to be performed prior to incorporating the shareable model into another model.

Data model merging logic 166 is invoked by the data visualization interface 130, 132 that is associated with the site 140, 150 that is to receive shared data as determined based on the particular data sharing request data 161. Data model merging logic 166 uses the constraint modifications that are determined by constraint modification logic 162 to merge a shareable model with a model that is currently being presented in the data visualization interface 130, 132 that is to receive the shareable model pursuant to the particular data sharing request 161. Examples of processes that can be used by data model merging logic 166 to merge a shareable model with another model are described in the aforementioned patents.

Data model merging logic 166 modifies a set of stored data merging parameters 163 and/or model mapping specifications 165 based on the constraint modifications that are determined by constraint modification logic 162, to create a context-specific version of data merging parameters 163 and/or model mapping specifications 165. Data model merging logic 166 uses the context-specific version of data merging parameters 163 and/or model mapping specifications 165 to generate a merged version of the current model that includes changes or updates that are contained in the shareable model. For example, if any data sharing processes were skipped in the preparation of the shareable model, data model merging logic 166 may execute one or more of the skipped processes before completing the model merging process.

Examples of merge parameters 168 include data values, such as a flag that is set to yes or no, or a value that is changed from 0 to 1, that serve as indicators that enable data model merging logic 166 to determine whether to execute or skip certain data sharing processes while merging the shareable model with the current model. For example, if data sharing request data 161 indicates that the requested sharing operation involves a data import, data model merging logic 166 may determine to skip or execute one or more conflict resolution processes in order to reduce the amount of time it takes to complete the model merging process.

Examples of model mapping specifications 165 include rules for performing object resolution between heterogenous databases or models. Constraint modification logic 162 may include logic for determining whether model mapping specifications 165 are available for a particular heterogenous model pair and for determining whether to enforce those specifications in a particular data sharing context.

Skipping conflict resolution processes may reduce latency but may increase the number of errors (such as duplicate data or mis-aligned data) in the data sharing process. Executing conflict resolution processes can ensure that data is not duplicated when the models are merged. These trade-offs may be acceptable in certain applications, and the constraint modification logic 162 can be calibrated to meet the requirements of particular applications.

Process Overview

Figure 2:
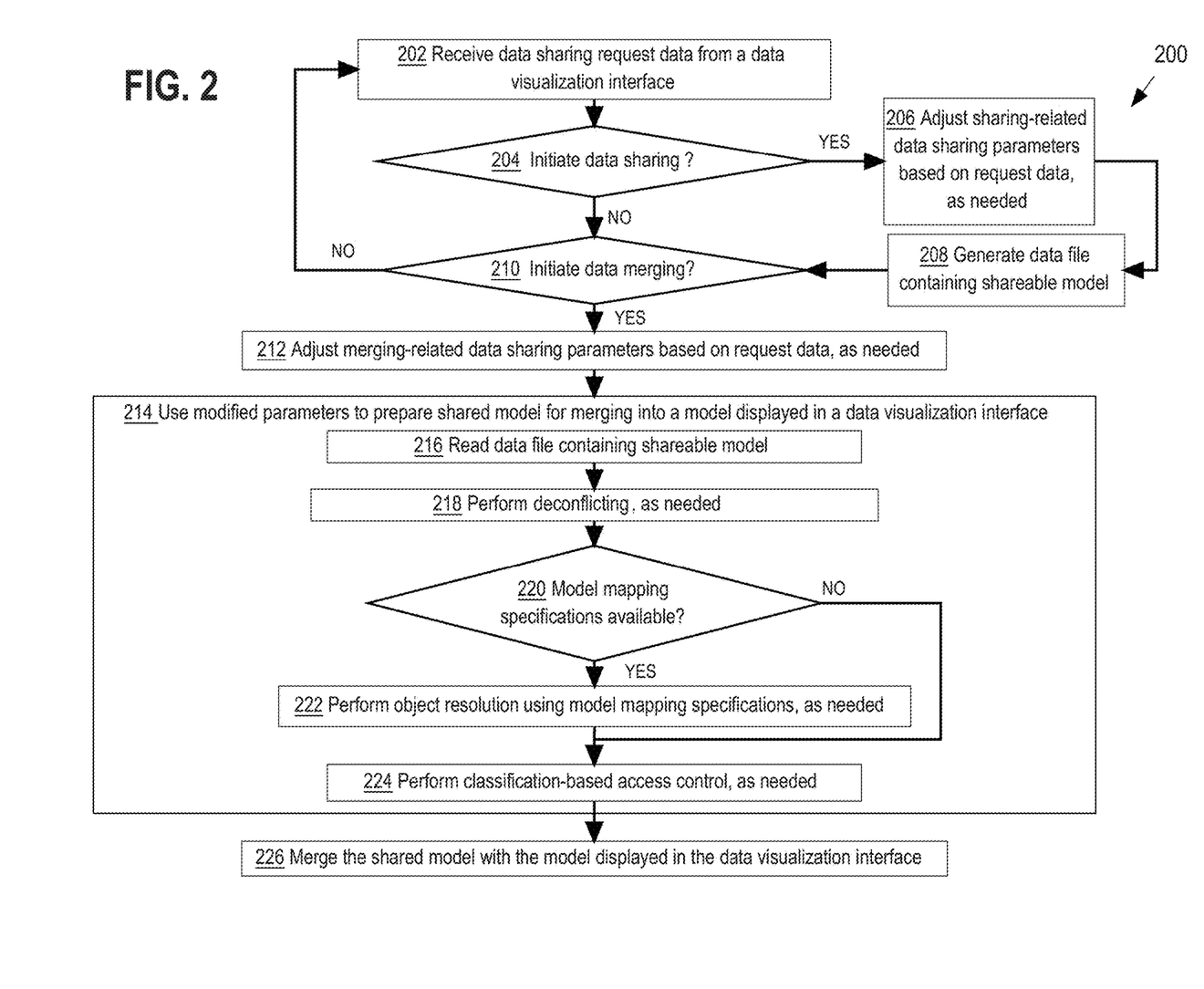
FIG. 2 is a flow diagram that depicts a data sharing process.
Figure 3:
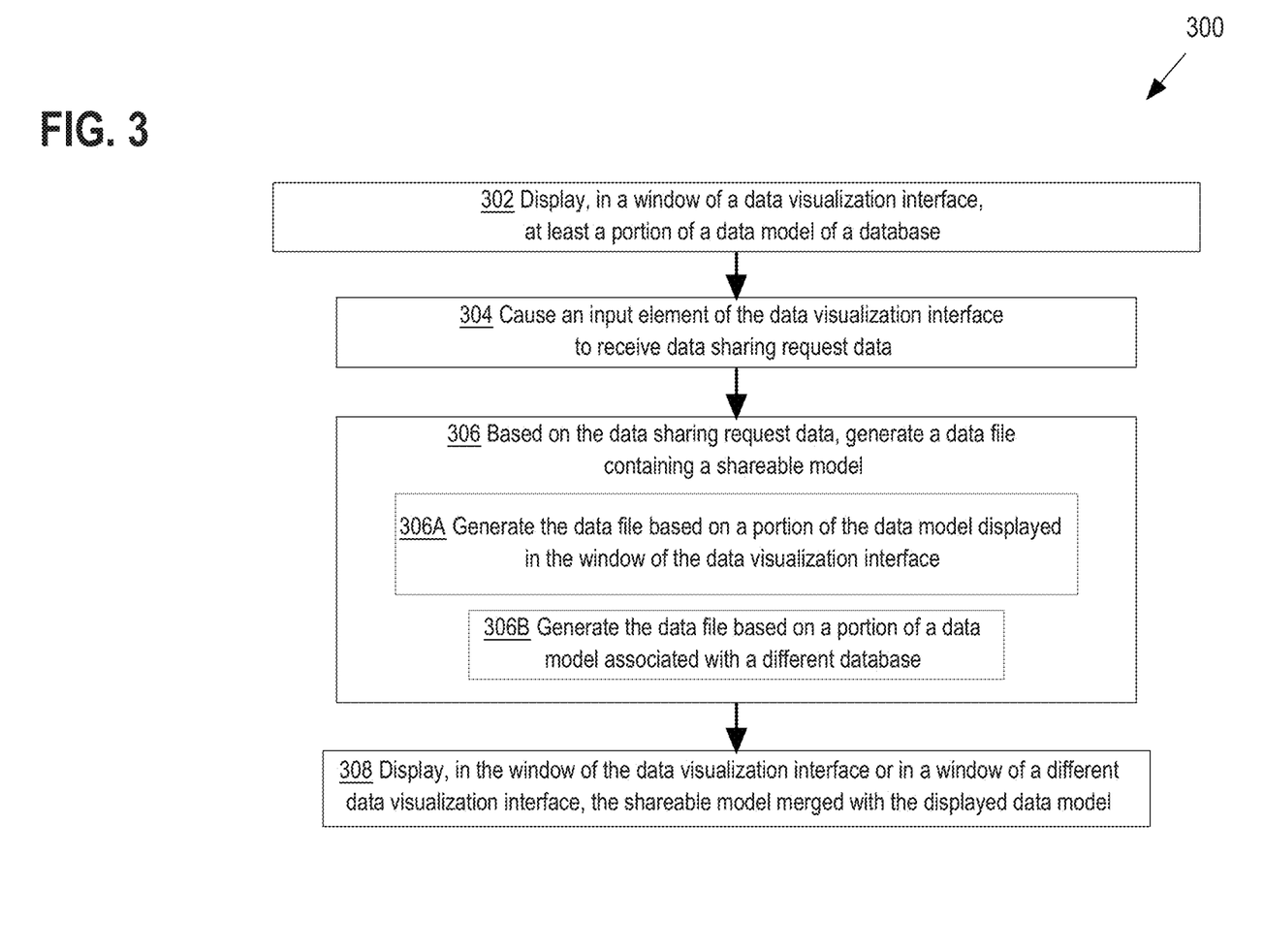
FIG. 3 is a flow diagram that depicts a data sharing process.

FIG. 2 and FIG. 3 illustrate data sharing processes that can be performed by computing system 100. FIG. 2 is a flow diagram that depicts a process 200 for sharing models and associated data across sites (such as sites 140, 150) and merging portions of the shared model and associated data in a data visualization interface (such as a data visualization interface 130, 132). Process 200 may be performed by a single entity or program or by multiple entities or programs, including a server computer receiving communications from one or more client devices. The operations of the process as shown in FIG. 2 can be implemented using processor-executable instructions that are stored in computer memory. For purposes of providing a clear example, the operations of FIG. 2 are described as performed by computing device(s) 110, which may be individually or collectively referred to as simply computing system 100.

In operation 202, computing system 100 receives data sharing request data (such as data sharing request data 161) from a data visualization interface via a data communication protocol such as a secure hypertext transfer protocol (HTTPS) or secure sockets layer (SSL). In operation 204, computing system 100 determines whether to initiate a data sharing process based on the data sharing request data received in operation 202.

For example, data sharing request data may include a request to export data from the data visualization interface initiating the request, to enable data sharing with another data visualization interface. In another example, data sharing request data may include a request from a data visualization interface associated with a particular database (such as database 142, 158) to conduct a search across one or more other databases, in which case executing the search may involve exporting portions of models and/or data from other sites, responsive to the search query, and importing retrieved portions of models and/or data into the data visualization interface initiating the search. When computing system 100 determines that data sharing request data includes a request for data sharing, computing system 100 proceeds to operation 206. If computing system 100 determines that data sharing request data does not include a request for data sharing, computing system 100 proceeds to operation 210.

In operation 206, computing system 100 adjusts one or more data sharing parameters based on the data sharing request data, as needed. For example, computing system 100 may relax one or more conflict resolution constraints based on the data sharing request data. In operation 208, computing system 100 generates a data file containing a shareable version of at least a portion of the data model requested to be shared, as determined pursuant to the data sharing request data. The data file can then be transmitted to another data visualization interface using messaging service 102, for example.

In operation 210, computing system 100 determines whether to initiate a data merging process, for example in response to a data import request received in operation 202. In operation 212, computing system adjusts one or more data merging parameters based on the data sharing request data received in operation 202, as needed. For example, computing system 100 may relax one or more conflict resolution constraints based on the data sharing request data or may enforce one or more conflict resolution constraints that was previously relaxed during a related data export operation.

In operation 214, computing system 100 uses the data merging parameters as modified in operation 212 to prepare at least a portion of a shareable model (such as sharable model generated in operation 208) for merging into a model displayed in a data visualization interface. In one use case, the shareable model has been received by the currently active data visualization interface that initiated the request in operation 202, as a result of an export operation by a different data visualization interface that is associated with a different database and model (in other words, a peer-to-peer export/import activity), such that the data visualization interface in which the models are merged is a different data visualization interface than the data visualization interface that initiated the export operation.

In another use case, the data visualization interface initiating the data sharing request may be the same for both the data sharing activities 206, 208 and the data merging activities 212, 214, 206. This may occur when the data sharing request involves a search, filter or feed operation, for example. For instance, a data visualization interface may request that another data sharing interface execute a data export operation after retrieving items responsive to a search query.

The illustrative operation 214 involves a number of sub-operations. In operation 216, computing system reads a data file that contains a shareable model (such as shareable model generated in operation 208). In operation 218, computing system 100 performs deconflicting, as needed, to resolve any issues with aspects of the shareable model that may have been concurrently or more recently changed in the current model with which the shareable model is to be merged, so that the merged model reflects the most current set of changes.

In operation 220, computing system 100 checks to see if model mapping specifications (such as model mapping specifications 165) are available, if the shareable model and the current model and/or their underlying databases are heterogenous. If model mapping specifications are not available or the models to be merged are not heterogenous, computing system 100 proceeds to operation 224. If model mapping specifications are available, computing system 100 proceeds to operation 222. In operation 222, computing system 100 performs object resolution using model mapping specifications identified in operation 220, as needed. The object resolution processes performed in operation 222 may be modified based on the adjustments to the data merging parameters made in operation 212.

In operation 224, computing system 100 performs classification-based access control, as needed, on the shareable model, to ensure that any access control restrictions are maintained after the models are merged. The classification-based access control processes may be modified based on the adjustments to the data merging parameters made in operation 212.

In operation 226, computing system 100 merges the shared model with current model displayed in the data visualization interface by completing the data import process. Operation 226 may be delayed or terminated if one or more of the sub-operations of operation 214 do not complete successfully, or computing system 100 may determine, based on the adjusted data merging parameters, to proceed with merging the models even if one or more of the sub-operations of operation 214 are not successfully completed.

FIG. 3 is a flow diagram that depicts a process for sharing data across sites and merging portions of the shared data in a data visualization interface. For example, FIG. 3 is a flow diagram that depicts a process for sharing data across sites 140, 150 and merging portions of the shared data in data visualization interface 130, 132. Process 200 may be performed by a single entity or program or by multiple entities or programs, including for example a browser plug-in and a remote server. The operations of the process as shown in FIG. 3 can be implemented using processor-executable instructions that are stored in computer memory. For purposes of providing a clear example, the operations of FIG. 3 are described as performed by computing device(s) 170, 172, 180, 182, which may be individually or collectively referred to as simply 'computing system 100.'

In operation 302, computing system 100 displays, in a window of a data visualization interface displayed in a display device (such as display device 180 or 182), at least a portion of a data model of a database. The display may include a graphical representation of the displayed portion of the data model.

In operation 304, computing system 100 causes an input element of the data visualization interface to receive data sharing request data (such as data sharing request data 161). Data sharing request data may be received by detection of an interaction with an input element of the data visualization interface, for example detection of a mouse click or tap on a touch screen control or keypad. Alternatively, or in addition, portions of data sharing request data may be received as audio (for example, speech) or video signals, by a microphone or camera of computing system 100.

In operation 306, computing system 100 generates a data file that contains a shareable model, based on the data sharing request data. In doing so, computing system 100 processes the data sharing request data, and modifies one or more data sharing parameters as needed based on the data sharing request data. For example, operation 306 may skip one or more data sharing processes (such as a conflict resolution process or data validation process) based on the modified data sharing parameters.

Operation 306 includes alternative sub-operations 306A, 306B. Alternative sub-operation 306A is executed when the data sharing request involves a data export request. As such, the data visualization interface of operation 302 is to export a portion of the data model displayed in its window, and operation 306A generates the data file based on a portion of the data model that is displayed in the window of that data visualization interface.

Alternative operation 306B is executed when the data sharing request involves a search, filter, or feed operation. As such, operation 306B generates the data file based on a portion of a data model that is associated with a different database; that is, a portion of a data model that was retrieved from another database as a result of a search or feed operation.

In operation 308, computing system 100 displays, in an appropriate data visualization interface, the shareable model merged with the displayed data model. If the data sharing request involves a data export, the merged model is displayed in a different data visualization interface than was used to create the export file. If the data sharing request involves a search or feed operation, the merged model is displayed in the same data visualization interface that initiated the search or feed operation.

Figure 4:
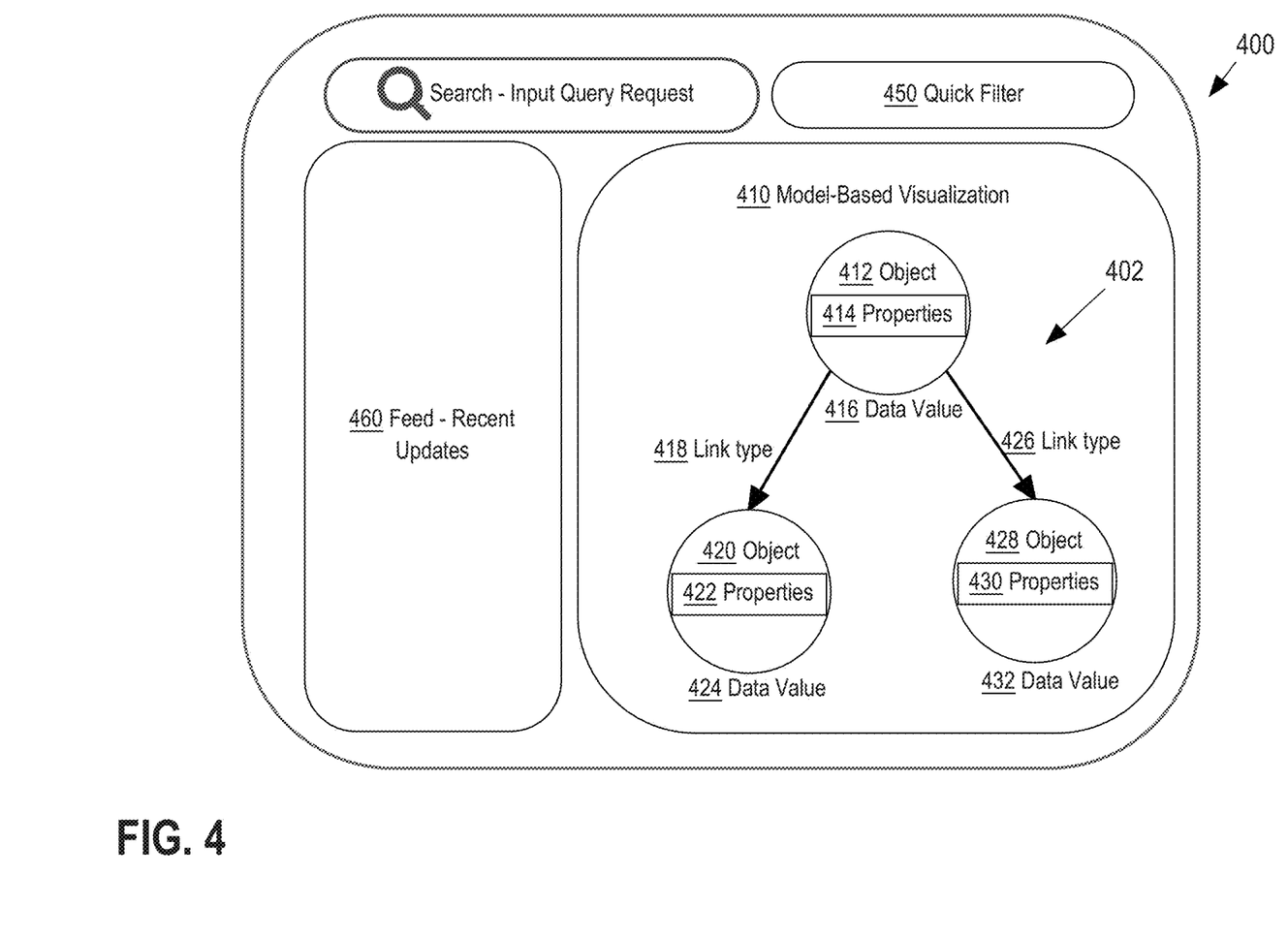
FIG. 4 is a screen capture showing computer-generated output in a graphical user interface using an example data visualization interface.

FIG. 4 is a screen capture showing computer-generated output in a graphical user interface using an example data visualization interface. The data visualization interface 130, 132 may be used in this example. Screen capture 400 includes a model based visualization 410. Model-based visualization displays at least a portion of a data model, using a graph 402. Graph 402 depicts data objects types 412, 420, 428, and properties 414, 422, 430, which are associated with the respective data objects 412, 420, 428. Examples of data object types are people, places, things, locations, groups. Examples of properties are characteristics of a data object type, such as age, purchase date, color. Graph 402 depicts relationships between data objects and labels indicating link types 418, 426. Examples of link types are "is a," "owner of," "brother of." Link types, object types, and properties can be generic or domain-specific.

The model-based visualization 410 also displays data values 416, 424, 432 associated with each data object. Data values 416, 424, 432 are obtained from the database with which the visualization 410 is associated, through communications between the visualization 410 and the database management system used to manage interactions with the database. Data values are instances of object types. For example, a data value may be an identifier, such as a person's name, phone number, or device identifier.

Screen capture 400 also includes graphical input elements such as search element 440. Search element 440 can receive search terms, such as keywords, and initiate execution of a search query on other models not currently displayed in visualization 410. Quick filter 450 can receive keywords that are used to initiate the excluding of portions of a model from the visualization 410. Screen capture 400 also includes a content display area 460, which can display recently changed portions of other models not currently displayed in visualization 410.

Implementation Example—Hardware Overview

According to one embodiment, the techniques described herein are implemented by one or more computing devices.

For example, portions of the disclosed technologies may be at least temporarily implemented on a network including a combination of one or more server computers and/or other computing devices. The computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such computing devices may also combine custom hard-wired logic, ASICs, or FPGAs with custom programming to accomplish the described techniques.

The computing devices may be server computers, personal computers, or a network of server computers and/or personal computers. Illustrative examples of computers are desktop computer systems, portable computer systems, handheld devices, mobile computing devices, wearable devices, body mounted or implantable devices, smart phones, smart appliances, networking devices, autonomous or semi-autonomous devices such as robots or unmanned ground or aerial vehicles, or any other electronic device that incorporates hard-wired and/or program logic to implement the described techniques.

Figure 5:
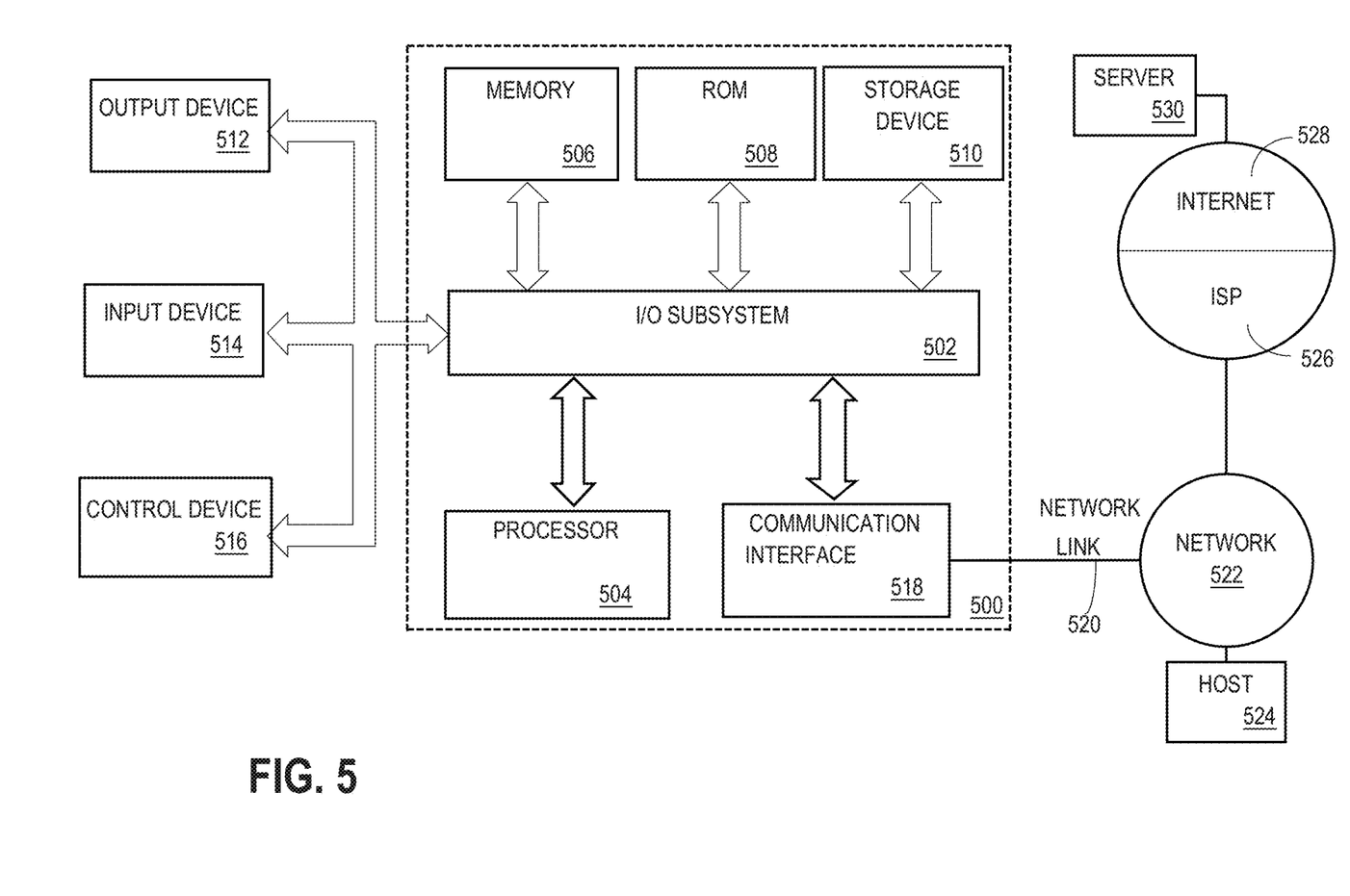
FIG. 5 is a block diagram that illustrates a computer system upon which an embodiment of the disclosed technologies may be implemented.

For example, FIG. 5 is a block diagram that illustrates a computer system 500 upon which an embodiment of the present invention may be implemented. Components of the computer system 500, including instructions for implementing the disclosed technologies in hardware, software, or a combination of hardware and software, are represented schematically in the drawings, for example as boxes and circles.

Computer system 500 includes an input/output (I/O) subsystem 502 which may include a bus and/or other communication mechanism(s) for communicating information and/or instructions between the components of the computer system 500 over electronic signal paths. The I/O subsystem may include an I/O controller, a memory controller and one or more I/O ports. The electronic signal paths are represented schematically in the drawings, for example as lines, unidirectional arrows, or bidirectional arrows.

One or more hardware processors 504 are coupled with I/O subsystem 502 for processing information and instructions. Hardware processor 504 may include, for example, a general-purpose microprocessor or microcontroller and/or a special-purpose microprocessor such as an embedded system or a graphics processing unit (GPU) or a digital signal processor.

Computer system 500 also includes a memory 506 such as a main memory, which is coupled to I/O subsystem 502 for storing information and instructions to be executed by processor 504. Memory 506 may include volatile memory such as various forms of random-access memory (RAM) or other dynamic storage device. Memory 506 also may be used for storing temporary variables or other intermediate information during execution of instructions to be executed by processor 504. Such instructions, when stored in non-transitory computer-readable storage media accessible to processor 504, render computer system 500 into a special-purpose machine that is customized to perform the operations specified in the instructions.

Computer system 500 further includes a non-volatile memory such as read only memory (ROM) 508 or other static storage device coupled to I/O subsystem 502 for storing static information and instructions for processor 504. The ROM 508 may include various forms of programmable ROM (PROM) such as erasable PROM (EPROM) or electrically erasable PROM (EEPROM). A persistent storage device 510 may include various forms of non-volatile RAM (NVRAM), such as flash memory, or solid-state storage, magnetic disk or optical disk, and may be coupled to I/O subsystem 502 for storing information and instructions.

Computer system 500 may be coupled via I/O subsystem 502 to one or more output devices 512 such as a display device. Display 512 may be embodied as, for example, a touch screen display or a light-emitting diode (LED) display or a liquid crystal display (LCD) for displaying information, such as to a computer user. Computer system 500 may include other type(s) of output devices, such as speakers, LED indicators and haptic devices, alternatively or in addition to a display device.

One or more input devices 514 is coupled to I/O subsystem 502 for communicating signals, information and command selections to processor 504. Types of input devices 514 include touch screens, microphones, still and video digital cameras, alphanumeric and other keys, buttons, dials, slides, and/or various types of sensors such as force sensors, motion sensors, heat sensors, accelerometers, gyroscopes, and inertial measurement unit (IMU) sensors and/or various types of transceivers such as wireless, such as cellular or Wi-Fi, radio frequency (RF) or infrared (IR) transceivers and Global Positioning System (GPS) transceivers.

Another type of input device is a control device 516, which may perform cursor control or other automated control functions such as navigation in a graphical interface on a display screen, alternatively or in addition to input functions. Control device 516 may be implemented as a touchpad, a mouse, a trackball, or cursor direction keys for communicating direction information and command selections to processor 504 and for controlling cursor movement on display 512. The input device may have at least two degrees of freedom in two axes, a first axis (e.g., x) and a second axis (e.g., y), that allows the device to specify positions in a plane. Another type of input device is a wired, wireless, or optical control device such as a joystick, wand, console, steering wheel, pedal, gearshift mechanism or other type of control device. An input device 514 may include a combination of multiple different input devices, such as a video camera and a depth sensor.

Computer system 500 may implement the techniques described herein using customized hard-wired logic, one or more ASICs or FPGAs, firmware and/or program logic which in combination with the computer system causes or programs computer system 500 to operate as a special-purpose machine. According to one embodiment, the techniques herein are performed by computer system 500 in response to processor 504 executing one or more sequences of one or more instructions contained in memory 506. Such instructions may be read into memory 506 from another storage medium, such as storage device 510. Execution of the sequences of instructions contained in memory 506 causes processor 504 to perform the process steps described herein. In alternative embodiments, hard-wired circuitry may be used in place of or in combination with software instructions.

The term "storage media" as used in this disclosure refers to any non-transitory media that store data and/or instructions that cause a machine to operation in a specific fashion. Such storage media may comprise non-volatile media and/or volatile media. Non-volatile media includes, for example, optical or magnetic disks, such as storage device 510. Volatile media includes dynamic memory, such as memory 506. Common forms of storage media include, for example, a hard disk, solid state drive, flash drive, magnetic data storage medium, any optical or physical data storage medium, memory chip, or the like.

Storage media is distinct from but may be used in conjunction with transmission media. Transmission media participates in transferring information between storage media. For example, transmission media includes coaxial cables, copper wire and fiber optics, including the wires that comprise a bus of I/O subsystem 502. Transmission media can also take the form of acoustic or light waves, such as those generated during radio-wave and infra-red data communications.

Various forms of media may be involved in carrying one or more sequences of one or more instructions to processor 504 for execution. For example, the instructions may initially be carried on a magnetic disk or solid-state drive of a remote computer. The remote computer can load the instructions into its dynamic memory and send the instructions over a communication link such as a fiber optic or coaxial cable or telephone line using a modem. A modem or router local to computer system 500 can receive the data on the communication link and convert the data to a format that can be read by computer system 500. For instance, a receiver such as a radio frequency antenna or an infrared detector can receive the data carried in a wireless or optical signal and appropriate circuitry can provide the data to I/O subsystem 502 such as place the data on a bus. I/O subsystem 502 carries the data to memory 506, from which processor 504 retrieves and executes the instructions. The instructions received by memory 506 may optionally be stored on storage device 510 either before or after execution by processor 504.

Computer system 500 also includes a communication interface 518 coupled to bus 502. Communication interface 518 provides a two-way data communication coupling to network link(s) 520 that are directly or indirectly connected to one or more communication networks, such as a local network 522 or a public or private cloud on the Internet. For example, communication interface 518 may be an integrated-services digital network (ISDN) card, cable modem, satellite modem, or a modem to provide a data communication connection to a corresponding type of communications line, for example a coaxial cable or a fiber-optic line or a telephone line. As another example, communication interface 518 may include a local area network (LAN) card to provide a data communication connection to a compatible LAN. Wireless links may also be implemented. In any such implementation, communication interface 518 sends and receives electrical, electromagnetic or optical signals over signal paths that carry digital data streams representing various types of information.

Network link 520 typically provides electrical, electromagnetic, or optical data communication directly or through one or more networks to other data devices, using, for example, cellular, Wi-Fi, or BLUETOOTH technology. For example, network link 520 may provide a connection through a local network 522 to a host computer 524 or to other computing devices, such as personal computing devices or Internet of Things (IoT) devices and/or data equipment operated by an Internet Service Provider (ISP) 526. ISP 526 provides data communication services through the world-wide packet data communication network commonly referred to as the "Internet" 528. Local network 522 and Internet 528 both use electrical, electromagnetic or optical signals that carry digital data streams. The signals through the various networks and the signals on network link 520 and through communication interface 518, which carry the digital data to and from computer system 500, are example forms of transmission media.

Computer system 500 can send messages and receive data and instructions, including program code, through the network(s), network link 520 and communication interface 518. In the Internet example, a server 530 might transmit a requested code for an application program through Internet 528, ISP 526, local network 522 and communication interface 518. The received code may be executed by processor 504 as it is received, and/or stored in storage device 510, or other non-volatile storage for later execution.

Implementation Example—Basic Software System

Figure 6:
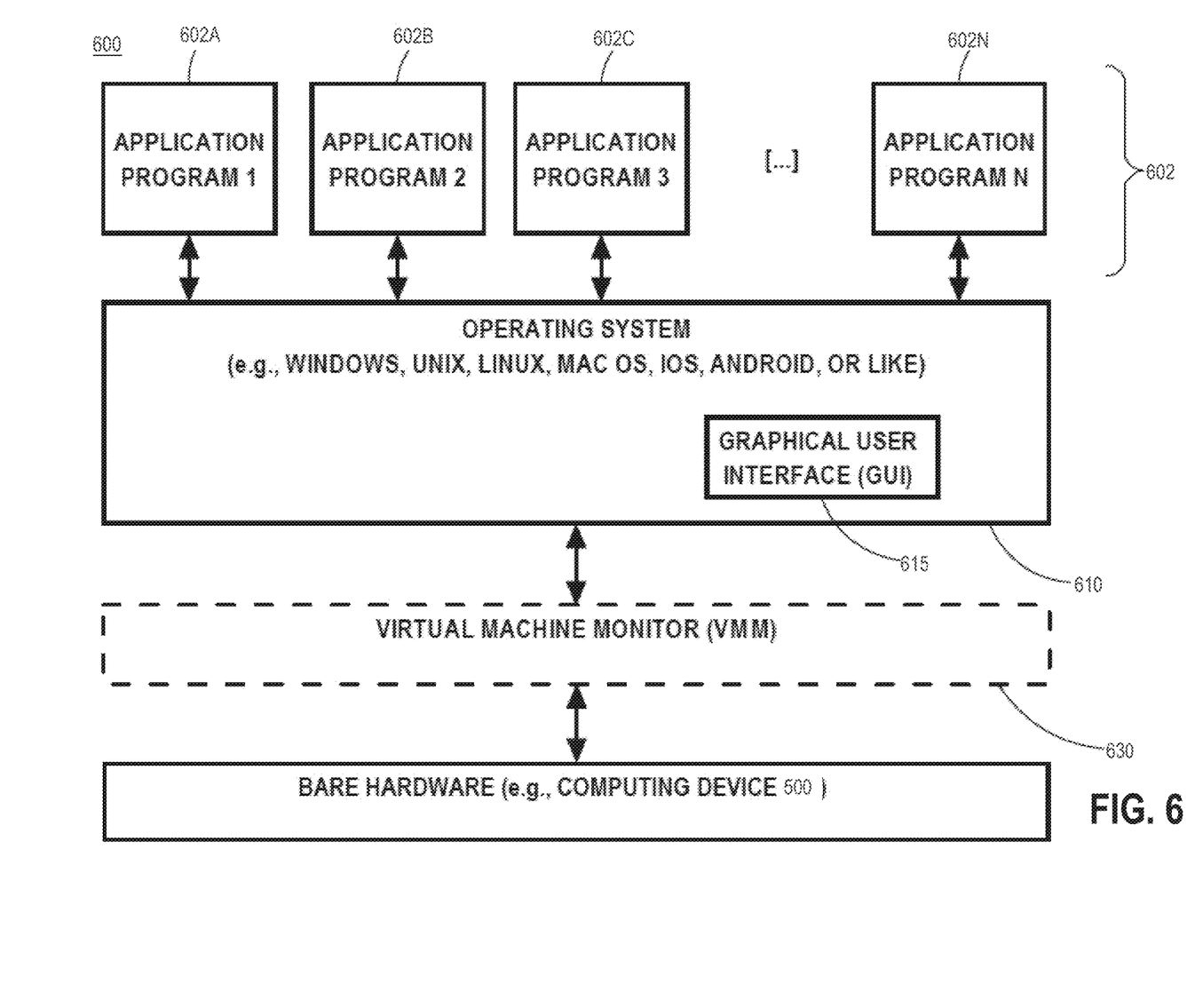
FIG. 6 is a block diagram of a basic software system that may be employed for controlling the operation of a computing device.

FIG. 6 is a block diagram of a basic software system 600 that may be employed for controlling the operation of computing device 500. Software system 600 and its components, including their connections, relationships, and functions, is meant to be exemplary only, and not meant to limit implementations of the example embodiment(s). Other software systems suitable for implementing the example embodiment(s) may have different components, including components with different connections, relationships, and functions.

Software system 600 is provided for directing the operation of a computing device, such as device 500. Software system 600, which may be stored in system memory (RAM) 506 and on fixed storage (e.g., hard disk or flash memory) 510, includes a kernel or operating system (OS) 610.

The OS 610 manages low-level aspects of computer operation, including managing execution of processes, memory allocation, file input and output (I/O), and device I/O. One or more application programs, represented as 602A, 602B, 602C . . . 602N, may be "loaded" (e.g., transferred from fixed storage 510 into memory 506 for execution by the system 600. The applications or other software intended for use on device 500 may also be stored as a set of downloadable computer-executable instructions, for example, for downloading and installation from an Internet location (e.g., a Web server, an app store, or other online service).

Software system 600 includes a graphical user interface (GUI) 615, for receiving user commands and data in a graphical (e.g., "point-and-click" or "touch gesture") fashion. These inputs, in turn, may be acted upon by the system 600 in accordance with instructions from operating system 610 and/or application(s) 602. The GUI 615 also serves to display the results of operation from the OS 610 and application(s) 602, whereupon the user may supply additional inputs or terminate the session (e.g., log off).

OS 610 can execute directly on bare hardware 620 (e.g., processor(s) 504) of device 500. Alternatively, a hypervisor or virtual machine monitor (VMM) 630 may be interposed between the bare hardware 620 and the OS 610. In this configuration, VMM 630 acts as a software "cushion" or virtualization layer between the OS 610 and the bare hardware 620 of the device 500.

VMM 630 instantiates and runs one or more virtual machine instances ("guest machines"). Each guest machine comprises a "guest" operating system, such as OS 610, and one or more applications, such as application(s) 602, designed to execute on the guest operating system. The VMM 630 presents the guest operating systems with a virtual operating platform and manages the execution of the guest operating systems.

In some instances, the VMM 630 may allow a guest operating system to run as if it is running on bare hardware of device 500 directly. In these instances, the same version of the guest operating system configured to execute on the bare hardware of device 500 directly may also execute on VMM 630 without modification or reconfiguration. In other words, VMM 630 may provide full hardware and CPU virtualization to a guest operating system in some instances.

In other instances, a guest operating system may be specially designed or configured to execute on VMM 630 for efficiency. In these instances, the guest operating system is "aware" that it executes on a virtual machine monitor. In other words, VMM 630 may provide para-virtualization to a guest operating system in some instances.

The above-described basic computer hardware and software is presented for purpose of illustrating the basic underlying computer components that may be employed for implementing the example embodiment(s). The example embodiment(s), however, are not necessarily limited to any particular computing environment or computing device configuration. Instead, the example embodiment(s) may be implemented in any type of system architecture or processing environment that one skilled in the art, in light of this disclosure, would understand as capable of supporting the features and functions of the example embodiment(s) presented herein.

GENERAL CONSIDERATIONS

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

Any definitions set forth herein for terms contained in the claims may govern the meaning of such terms as used in the claims. No limitation, element, property, feature, advantage or attribute that is not expressly recited in a claim should limit the scope of the claim in any way. The specification and drawings are to be regarded in an illustrative rather than a restrictive sense.

As used in this disclosure the terms "include" and "comprise" (and variations of those terms, such as "including," "includes," "comprising," "comprises," "comprised" and the like) are intended to be inclusive and are not intended to exclude further features, components, integers or steps.

References in this document to "an embodiment," etc., indicate that the embodiment described or illustrated may include a particular feature, structure, or characteristic, but every embodiment may not necessarily include the particular feature, structure, or characteristic. Such phrases are not necessarily referring to the same embodiment. Further, when a particular feature, structure, or characteristic is described or illustrated in connection with an embodiment, it is believed to be within the knowledge of one skilled in the art to effect such feature, structure, or characteristic in connection with other embodiments whether or not explicitly indicated.

Various features of the disclosure have been described using process steps. The functionality/processing of a given process step could potentially be performed in different ways and by different systems or system modules. Furthermore, a given process step could be divided into multiple steps and/or multiple steps could be combined into a single step. Furthermore, the order of the steps can be changed without departing from the scope of the present disclosure.

It will be understood that the embodiments disclosed and defined in this specification extend to alternative combinations of the individual features and components mentioned or evident from the text or drawings. These different combinations constitute various alternative aspects of the embodiments.

In the foregoing specification, embodiments of the disclosed technologies have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A computer system comprising:
   one or more processors;
   one or more storage media storing instructions which, when executed by the one or more processors, cause the one or more processors to perform operations comprising:
   receiving data sharing request data relating to a data model that is displayable in a data visualization interface, the data sharing request data including a type of requested data sharing operation or metadata about a previously executed data sharing process, the data model comprising a graphical representation of at least a portion of a database;
   modifying a value of a data sharing parameter associated with the data model based on the data sharing request data;
   based on the modified value of the data sharing parameter, skipping a particular data sharing process of a requested data sharing operation while generating a shareable version of the data model or while merging the shareable version of the data model with a different data model, the different data model comprising a graphical representation of at least a portion of a different database.

2. The system of claim 1, wherein the data sharing request data relates to a search query, the merging the shareable version of the data model with a different data model comprises including data retrieved by the search query in the different data model.

3. The system of claim 1, wherein the data sharing request data relates to a data export operation; the instructions, when executed by the one or more processors, cause the one or more processors to perform operations comprising exporting the shareable version of the data model from the data visualization interface and importing the shareable version of the data model into a different data visualization interface associated with the different data model.

4. The system of claim 1, wherein the data sharing request data relates to a data filtering operation; the instructions, when executed by the one or more processors, cause the one or more processors to perform operations comprising excluding data filtered by the filtering operation from a display of a data model.

5. The system of claim 1, wherein the data sharing request data relates to a data feed operation, the shareable version of the data model includes data retrieved by the data feed operation; the instructions, when executed by the one or more processors, cause the one or more processors to perform operations comprising displaying at least a portion of the shareable version of the data model in a window of a different data visualization interface associated with the different data model.

6. The system of claim 1, wherein the instructions, when executed by the one or more processors, cause the one or more processors to perform operations comprising, based on the modified value of the data sharing parameter, skipping an acknowledgement process associated with one or more of the generating the shareable version of the data model or the merging the shareable version of the data model with the different data model.

7. The system of claim 1, wherein the instructions, when executed by the one or more processors, cause the one or more processors to perform operations comprising, based on the modified value of the data sharing parameter, skipping a conflict resolution process associated with one or more of the generating the shareable version of the data model or the merging the shareable version of the data model with the different data model.

8. The system of claim 1, wherein the instructions, when executed by the one or more processors, cause the one or more processors to perform operations comprising determining model mapping specifications associated with the different data model; using the model mapping specifications, associating at least a portion of the shareable version of the data model with the different data model.

9. A system comprising:
one or more processors;
one or more storage media storing instructions which, when executed by the one or more processors, cause the one or more processors to perform operations comprising:
displaying at least a portion of a data model in a data visualization interface, the data model comprising a graphical representation of a database;
by an input element of the data visualization interface, receiving data sharing request data, the data sharing request data indicating a type of requested data sharing operation;
determining a modified value of a data sharing parameter associated with the data model, the modified value of the data sharing parameter modified based on the type of requested data sharing operation;
based on the modified value of the data sharing parameter, skipping a particular data sharing process of a requested data sharing operation while merging a shareable portion of a different data model with the data model in the data visualization interface, the different data model comprising a graphical representation of at least a portion of a different database.

10. The system of claim 9, wherein the instructions, when executed by the one or more processors, cause the one or more processors to perform operations comprising during the merging, skipping an acknowledgement process based on the data sharing request data.

11. The system of claim 9, wherein the instructions, when executed by the one or more processors, cause the one or more processors to perform operations comprising, during the merging, skipping a conflict resolution process based on the data sharing request data.

12. The system of claim 9, wherein the instructions, when executed by the one or more processors, cause the one or more processors to perform operations comprising, during the merging, determining model mapping specifications associated with the data model; using the model mapping specifications, associating at least a portion of the shareable portion of the different data model with the data model in the data visualization interface.

13. The system of claim 9, wherein the data sharing request data relates to a search query or a feed operation, the instructions, when executed by the one or more processors, cause the one or more processors to perform operations comprising merging data retrieved by the search query or the feed operation with the data model in the data visualization interface.

14. The system of claim 9, wherein the data sharing request data relates to a data filtering operation, the instructions, when executed by the one or more processors, cause the one or more processors to perform operations comprising excluding data filtered by the filtering operation from the display of the data model in the data visualization interface.

15. A method comprising:
displaying at least a portion of a data model in a data visualization interface, the data model comprising a graphical representation of at least a portion of a database;
by an input element of the data visualization interface, receiving data sharing request data, the data sharing request data indicating a type of requested data sharing operation;
determining a modified value of a data sharing parameter associated with the data model, the modified value of the data sharing parameter modified based on the type of requested data sharing operation;
based on the modified value of the data sharing parameter, skipping a particular data sharing process of a requested data sharing operation while merging a shareable portion of a different data model with the data model in the data visualization interface, the different data model comprising a graphical representation of at least a portion of a different database, wherein the method is performed using one or more processors.

16. The method of claim 15, comprising, during the merging, skipping an acknowledgement process based on the data sharing request data.

17. The method of claim 15, comprising, during the merging, skipping a conflict resolution process based on the data sharing request data.

18. The method of claim 15, comprising, during the merging, determining model mapping specifications associated with the data model; using the model mapping specifications, associating at least a portion of the shareable portion of the different data model with the data model in the data visualization interface.

19. The method of claim 15, wherein the data sharing request data relates to a search query or a data feed operation and the method comprises merging data retrieved by the search query or the data feed operation with the data model in the data visualization interface.

20. The method of claim 15, wherein the data sharing request data relates to a data filtering operation and the method comprises excluding data filtered by the filtering operation from the display of the data model in the data visualization interface.

* * * * *